Patented Sept. 28, 1948

2,450,027

UNITED STATES PATENT OFFICE 2,450,027

DIMERIZATION OF ALPHA-ALKYL PARA-ALKYL STYRENES

Arthur J. Warner, South Orange, and Theodore H. Talbot, East Orange, N. J., assignors to Federal Telephone and Radio Corporation, New York, N. Y., a corporation of Delaware No Drawing. Application December 21, 1943, Serial No. 515,168

8 Claims. (Cl. 260—669)

1

This invention relates to the dimerization of alpha-alkyl para-alkyl styrenes, and to the products thereof.

A feature of the invention is the production of said dimers in an exceptionally pure and homogeneous form which has unusual and unexpected characteristics. The products are substantially different from those heretofore made by methods employing sulfuric acid as a catalyst; and it is believed that said methods in fact produce a substance including a considerable proportion of compounds other than said dimer which materially affect its properties and introduce variations and uncertainty in the physical characteristics of said product. The dimers obtained in this manner, when separated from solvents and diluents, are believed to include a considerable proportion in solid form and therefore substantially different from the dimers produced in accordance with this invention.

The general purposes of the invention include the production of substantially pure dimers of alpha-alkyl para-alkyl styrenes, the development of a process which will result in a high yield of said dimers and the provision of a reaction which can be completed very rapidly, thereby enhancing materially the commercial value and practicability of the process.

The invention includes a process in which activated impure kaolin, particularly fuller's earth or similar bleaching earths are employed as catalysts. When such earths are used as polymerization catalysts for substances of the indicated type without special preparation or regulation, they are relatively ineffective, and in particular the results obtained vary widely and the yields are relatively low. A feature of the invention is the preparation of the fuller's earth by activation at a relatively high temperature. This treatment produces an efficient catalyst with which rapid reaction and high yields of the dimers can be obtained.

It has been found that the variety of fuller's earth from Florida known as floridin is especially effective as a catalyst. In order to prepare it for use it should be heated to a temperature between 200° C. and 400° C., and preferably between 325° C. and 375° C., the optimum temperature being 350° C. The catalyst will be properly activated by heating at the required temperature for about two hours, or longer if desired.

It has been found that the temperature to which the floridin is heated is of substantial importance in this process having an unexpected effect on the rate of reaction and the percentage of yield of the desired dimer. This result is apparently due to dehydration of the earth, and therefore the time and temperature of activation should be sufficient to drive off water which is present in combination in such earth.

2

The proportion of catalyst employed also has an important bearing on the efficiency of the process. A minimum amount of ½% should be used, and the maximum amount should not exceed 10%, the optimum range being between 2% and 5%. It has been found that there is an intimate relationship between the percentage of the catalyst and the starting temperature of the reaction if maximum yield is to be obtained. For instance, in making the dimer of alpha-methyl para-methyl styrene, the starting point should be at least 60° C., and a temperature in the range between 90° C. and 100° C. is most advantageous when the catalyst is used in a proportion between 2% and 5%. The upper limit of the starting temperature is the boiling point, and it preferably is kept at least slightly below the boiling point, that is, sufficiently below said point to avoid the danger that the temperature may unintentionally rise above boiling, since it has been found that in order to produce the liquid dimers of the type indicated herein, boiling should be avoided. The optimum starting temperature range for different alpha-alkyl para-alkyl styrenes will maintain a relationship to the boiling point similar to that given above for alpha-methyl para-methyl styrene.

A feature of the invention is the rapidity with which the reaction takes place, generally within a few minutes. This is in marked contrast to processes such as those employing sulfuric acid catalysts, which frequently require hours to complete the polymerization. Moreover, the yield of the dimer is, in most cases, very high, and it is obtained in a very pure form, which can readily be separated from the remaining constituents. The exact time of reaction may vary somewhat with different styrene derivatives of the indicated type and different conditions of reaction; but its conclusion for any given materials and conditions can readily be determined by the stabilization of the refractive index.

After the dimerization is ended the catalyst is removed in any desired manner, as by filtration or centrifuging, and the dimer is separated by fractional distillation from the other constituents, which ordinarily will consist of a small amount of higher polymers and a small residue of the monomer.

The process is effective for producing dimers of the alpha-alkyl para-alkyl styrenes which do not have more than five carbon atoms in either substituent. For instance, the process can be used for obtaining the dimers of alpha-methyl para-methyl styrene, alpha-ethyl para-ethyl styrene, alpha-propyl para-propyl styrene, alpha-butyl para-butyl styrene and alpha-amyl para-amyl styrene. It is also effective for obtaining dimers of the alpha-para styrenes which have carbon side chains of different lengths, such as alpha-methyl para-ethyl styrene, alpha-methyl para-propyl styrene, alpha-methyl para-butyl styrene, alpha-methyl para-amyl styrene, alpha-ethyl para-methyl styrene, alpha-butyl para-methyl styrene, alpha-ethyl para-butyl styrene and other alpha-para styrenes containing alpha and para substituents to and including the amyl stage. The reactions are similar, the required proportion of the catalyst being substantially the same and the optimum and maximum temperatures varying similarly to the variation in the boiling points, as already noted.

The following examples include specific processes which illustrate the invention.

*Example 1*

500 grams of crude monomeric alpha-methyl para-methyl styrene having a refractive index $N_D^{20°}$ 1.5337 was reacted with 2% of activated fuller's earth at an initial reaction temperature of 100° C., reaching a maximum temperature of 141° and a maximum refractive index $N_D^{20°}$ 1.5580 in 5 minutes, when the reaction was terminated. Fractional distillation separated a substantially pure dimer of alpha-methyl para-methyl styrene representing a yield of about 81%, a monomeric fraction of about 14% and a fraction including higher polymers totaling about 6%.

*Example 2*

44.5 grams of crude monomeric alpha-methyl para-ethyl styrene having a refractive index $N_D^{20°}$ 1.5130 was reacted with 4.6% of activated fuller's earth at an initial reaction temperature of 180° C, reaching a relatively stable refractive index $N_D^{20°}$ 1.5200 after 63 minutes, when the reaction was complete. Fractional distillation separated a substantially pure dimer of alpha-methyl para-ethyl styrene representing a yield of 15%, a monomeric fraction of 79% and a fraction including higher polymers totaling 9%.

The resulting dimers of the alpha-alkyl para-alkyl styrenes are substantially colorless liquids of low viscosity, free from unpleasant odor and having high boiling points and low freezing points, the boiling points being above 300° C. while the freezing points are −25° C. and lower. Their densities are about 1.0, and their refractive indexes are of the order of 1.55 at 20° C. Their dielectric constant throughout the range from 100 cycles to 3 megacycles is about 2.5, while the power factor for the same frequencies is less than 0.001.

Said dimers are valuable as plasticizers, especially for synthetic resins of the vinyl type, having been used with particular effectiveness in plasticizing polystyrene. They are advantageous when combined with resins or other substances that are used where their insulating properties are important, in view of the exceptional electrical qualities of said dimers.

The dimers are also useful as impregnants for capacitors, as cable oils, and in similar uses where their electrical qualities are exceptionally valuable. They are suited for use as heat-exchange liquids, and constitute desirable transformer oils. They are miscible with substantially all standard organic solvents except the lower alcohols, and are of importance as solvents. These characteristics are distinctive of the dimers obtained by this process; and a feature of the invention is the production of said dimers having a purity substantially higher than has heretofore been obtained and unexpected characteristics which were heretofore unknown.

The reaction details which have been given are on the basis of atmospheric pressure; and changes in pressure will vary the reaction conditions in known manner. The percentages given are by weight. It is understood when referring generally to dimers that the dimers of the described alpha-alkyl para-alkyl styrenes are indicated.

While certain preferred forms of the invention have been disclosed, this disclosure is intended to be by way of illustration and not limitation, since numerous other variations apparent to those skilled in this art can be made without departing from the invention as set forth in the claims.

We claim:

1. The method of making substantially pure dimers of alpha-alkyl para-alkyl styrenes which comprises the steps of mixing a monomeric alpha-alkyl para-alkyl styrene having not more than five carbon atoms in either the alpha or the para substituents at temperatures in the range between 60° C. and the boiling point of the monomer, with between ½% and 10% by weight of previously activated fuller's earth, said fuller's earth having been activated by heating at temperatures between 200° C. and 400° C., maintaining the mixture within said temperature range until the refractive index is substantially stabilized, removing the fuller's earth and separating the dimer from the remaining constituents.

2. The method set forth in claim 1 in which the fuller's earth is floridin.

3. The method set forth in claim 1 in which the fuller's earth is activated by heating at temperatures between 200° C. and 400° C. until substantially anhydrous.

4. The method set forth in claim 1 in which the fuller's earth is activated by heating between 325° C. and 375° C. until substantially anhydrous.

5. The method set forth in claim 1 in which the monomer is mixed with between 2% and 5% of the fuller's earth.

6. The method set forth in claim 1 in which the fuller's earth is floridin, used in proportions between 2% and 5%.

7. The method set forth in claim 1 in which the styrene compound is alpha-methyl para-methyl styrene.

8. The method set forth in claim 1 in which the styrene compound is alpha-methyl para-ethyl styrene.

ARTHUR J. WARNER.
THEODORE H. TALBOT.

REFERENCES CITED

The following references are of record in the file of this patent:

UNITED STATES PATENTS

| Number | Name | Date |
|---|---|---|
| 2,249,987 | Stanley et al. | July 22, 1941 |
| 2,289,743 | Warner | July 14, 1942 |
| 2,349,781 | Weizmann | May 23, 1944 |

FOREIGN PATENTS

| Number | Country | Date |
|---|---|---|
| 524,156 | Great Britain | July 31, 1940 |

OTHER REFERENCES

Beil 5, 654 (1922). (Copy in Division 6.)